Patented Oct. 5, 1954

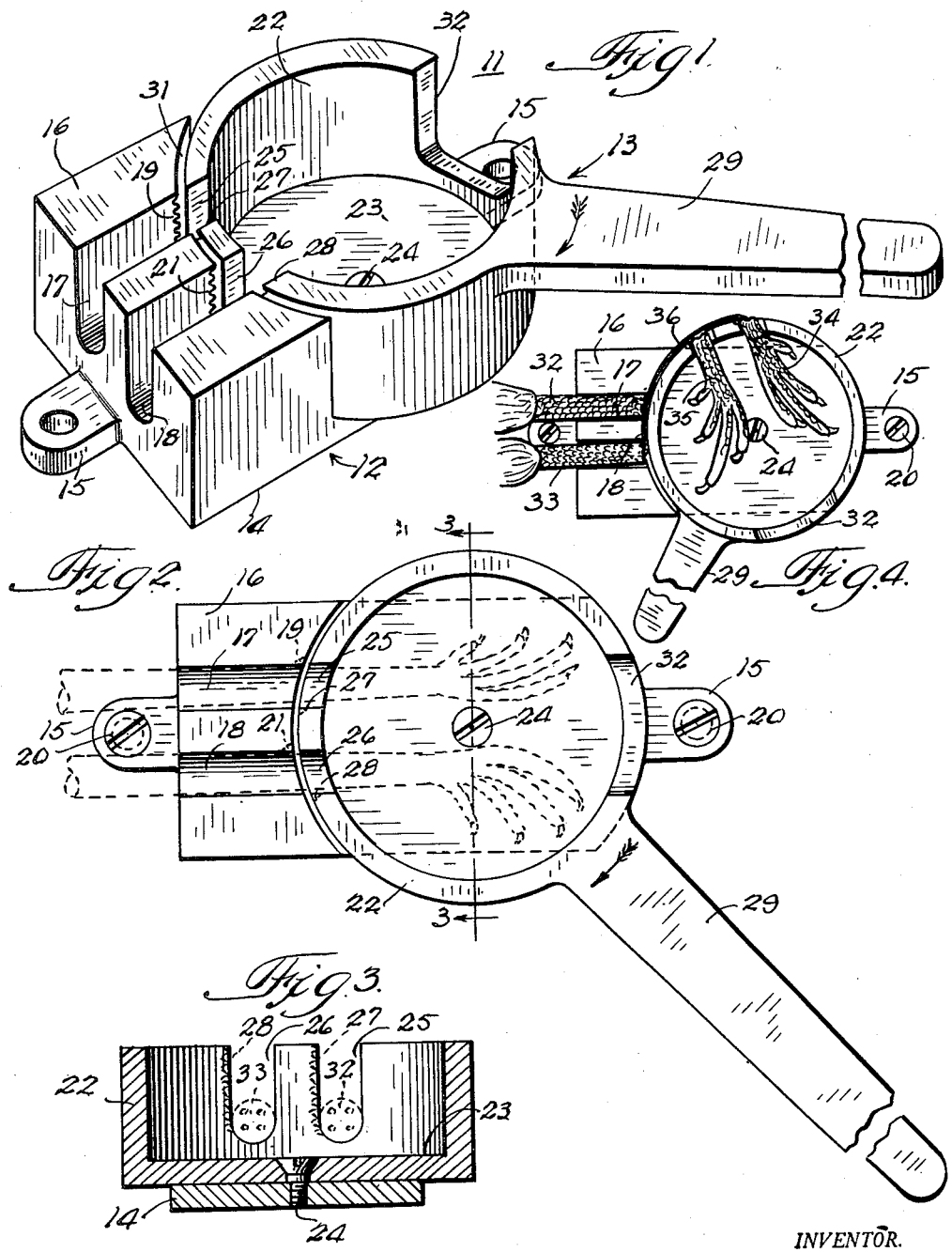

2,690,588

UNITED STATES PATENT OFFICE 2,690,588

POULTRY TENDON EXTRACTOR

Henry A. Hillsen, Sr., Sunland, Calif.

Application August 6, 1952, Serial No. 302,913

9 Claims. (Cl. 17—11.3)

This invention relates to poultry dressing apparatus, and more particularly to apparatus for the removal of tendons from the legs or drumsticks of poultry.

The tendons which operatively connect the body of a bird to its feet are tough, fibrous members which are undesirable in a bird which is prepared for eating. In the past it has been the custom to separate the lower legs and feet of poultry by cutting or breaking the legs at the lowest joint and at the same time cutting the associated tendons at that point. This, however, results in the severed tendons, sometimes having sharp, pointed, and jagged ends, remaining in the edible portions of the bird and often cause inconvenience or injury to those eating the same.

Various apparatus has heretofore been proposed for withdrawing the tendons from the edible leg, but all of these have failed to adequately or satisfactorily solve the problem. They are generally cumbersome, hooklike affairs which require a skilled and powerful operator and are often dangerous to persons in the general vicinity thereof. The manner in which these devices operate necessitates the application of a large tensile force either directly on the bird or through an appropriate arrangement of levers, wedges or the like. The application and sudden release of these forces is extremely hazardous and often results in injury to the operator.

Therefore, it is a principal object of this invention to provide new apparatus which will readily and safely remove the tendons from the legs of poultry.

It is a further object of this invention to provide apparatus capable of severing the tibiotarsus, sometimes called the lower leg or shank of such poultry, and subsequently removing the tendons from the legs or drumsticks thereof.

It is an additional object of this invention to provide apparatus which is readily mounted on a workbench or counter accessible to a butcher or the like purveying such poultry.

It is another object of this invention to provide such tendon-removing apparatus which operates through the application of a shearing force rather than the application of a pure tensile force, thereby producing apparatus which is safer for operators and requires less skill and strength on the part of such operators.

It is an additional object of this invention to provide apparatus which will in one single motion sever the shanks of such poultry and remove the tendons therefrom.

Further and additional objects of the invention will be manifest from the specification, accompanying drawings, and appended claims.

In carrying out this invention in one form, a fixed furcate or slotted member is provided in which the upper portion of the shanks of a bird are placed and a rotatable member is adapted to engage the lower portion of the shanks whereby relative rotation of said members will first sever said shanks and then remove the tendons therefrom. More particularly, apparatus in one form of this invention includes a fixed member having two slotted openings in which the legs of such a bird are placed and a rotatable cylindrical member having corresponding slots in which the feet of said bird are placed. By rotating the cylindrical member a shearing force is applied which first breaks the shanks of said bird and then removes the tendons therefrom.

For a more complete understanding of this invention reference should now be made to the accompanying drawings, in which:

Figure 1 is a perspective view of one embodiment of this invention;

Fig. 2 is a plan view of the embodiment of Fig. 1, showing the manner in which a bird would be placed in the apparatus;

Fig. 3 is a view in section of the apparatus of Fig. 2 taken along the line 3—3 thereof; and Fig. 4 illustrates on a reduced scale the manner in which the apparatus functions on the legs of a bird.

Referring now to the drawings, and more particularly to Fig. 1, a tendon extractor 11 is provided having a fixed base portion 12 and a cooperating rotatable portion 13. The base 12 consists of a flat portion 14 having a mounting bracket 15 at each end thereof. These brackets 15 are utilized to secure the fixed portion of the apparatus to an appropriate bench by means such as the screws 20 whereby sufficient force may readily be applied in the operation of the device. Extending upward from the fixed base is a furcate jaw member 16 in which the slots 17 and 18 are provided to receive the legs of a bird. While this apparatus is useful for all types of birds in dressing the same for eating, it is especially designed for use in the removal of tendons from the legs of turkeys. The tendons in the legs of turkeys are unusually tenacious, and it is often considered impossible, or at least impractical, to remove the same. However, as the tendons are objectionable if allowed to remain in the edible portions of the bird, it is highly desirable that the same be removed. The slots 17 and 18 are serrated along the edges 19 and 21 so that a positive frictional engagement can be made with the shank of the turkey to prevent slipping and to facilitate a shearing motion of the apparatus. These serrations are also desirable in that a path is provided for the extracted tendons which not cut said tendons but will aid in their extraction as will be described subsequently.

The rotatable portion 13 consists of a cylindrical member 22 having one end closed by a cap 23, the cap 23 having a central aperture through which a bolt 24 extends. The bolt 24 threadably engages the flat portion 14 of the base 12 as shown best in the sectional view, Fig. 3, whereby the cylinder 22 is freely rotatable about its axis. The cylinder 22 has slots 25 and 26 corresponding to the slots 17 and 18 of the base member. In a like manner the slots 25 and 26 are serrated along their leg-engaging surfaces 27 and 28 to more positively engage the legs of a bird being operated upon to thus prevent slipping and facilitate the shearing of the shanks.

As shown in Fig. 1, the apparatus when in position for use has slots 17 and 18 in the fixed portion of the apparatus aligned with the slots 25 and 26 of the movable portion, and in such a position the legs of a fowl are readily placed in the slots, as shown best in Fig. 2. A handle 29 is fixed to the cylindrical member 22 to facilitate rotation thereof. The handle 29 may be of any desired length depending upon the space available and the general requirements of the device. If the device is generally being utilized for large birds it is desirable that the handle 29 be quite long to produce the leverage necessary to readily shear the lower legs of the fowl. However, in a limited space, a shorter handle may be utilized which merely requires increased force for operation.

The fixed uprights 16 and the rotatable cylinder 22 are spaced apart a distance sufficient to allow only the passage of tendons therebetween. This gap 31 may be of any desired width but in this embodiment was made substantially ⅛ of an inch. This is sufficient to pass the tendons of any bird which might generally be encountered in the trade. As shown in Figs. 1, 2, and 4 the uprights 16 have a curved or arcuate surface defining the gap 31, said arcuate surface corresponding to the curvature of cylindrical member 22.

It is desirable that the slots 17 and 18 be of substantial length and width relative to the gap 31. It is desired that the operations herein described be performed by a shearing operation, and not by the application of tensile force as there is little or no damage to the fleshy portions of a bird when a shear force is thus applied. This shearing action is assured by the proper choice of slotted members and gap therebetween. As there is no tensile force applied to the legs, the slots may be of substantial width and there is no need for a wedging action to properly support the legs. The slots 17 and 18 and the corresponding slots 25 and 26 in the movable portion 13 preferably have substantially parallel sides whereby the legs of the fowl may readily be deposited therein and removed therefrom. Such a parallel sided construction is possible in a device constructed in accordance with this invention as no wedging action is relied upon for satisfactory operation.

An opening 32 is provided in the cylinder to allow the feet of a bird being operated upon to extend beyond the circumference of the cylinder 22 if this is required. In some instances the legs of a bird may already have been broken at or near the lower joint, and it is thus desirable to use this apparatus merely to remove the tendons. In that event it would clearly be desirable to allow the already broken legs to align with the apparatus in such a manner that an additional break would not be required. By aligning the existing break with the gap 31, rotation of the cylinder 22 would merely withdraw the tendons from the already severed legs.

Fig. 4 shows a pair of legs 32, 33 which have been placed in this apparatus and upon which the tendon-extracting operation has already been performed. As is clear from this figure, the legs 32, 33 were placed in the slots 17, 18 of the fixed member 16 and the handle 29 was rotated in a clockwise direction. This first severed the foot members 34, 35 from the corresponding legs by a shearing action between the serrated edges of the corresponding slots, and further rotation of the handle 29 withdrew the tendons 36 from the upper legs 32, 33 and caused said tendons to align along the periphery of the rotated cylindrical member 22. While a rotation of the handle and cylindrical member is here shown of the order of a quarter turn, or 90°, it should be clear that such extensive rotation is not necessary, but the only necessary motion is one sufficient first to break the legs and, second, to break the attachment of the tendons 36 from the bones of the legs 32 and 33. Once the attachment of the tendons is broken very little force is required to completely withdraw the tendons from the legs, and it is not necessary that sufficient rotation be provided to completely withdraw the tendons therefrom.

It will be obvious to one skilled in the art that certain modifications can be made in the apparatus herein disclosed without departing from the inventive concepts taught herein and encompassed within the appended claims. It is clearly not necessary that a complete cylindrical member 22 be provided or that two slots for receiving legs be provided. It might be desired to operate on the legs singly, and in that event a single slotted member could be utilized.

It will thus be seen that a new tendon extractor is provided in which a shearing force is applied to the shanks of poultry to be dressed to severe said shanks by the application of a rotating force upon a pivoted member in which a predetermined space is provided between the fixed and pivoted members whereby continued rotation of said pivoted member will extract the tough tendons from the legs of such poultry.

Without further elaboration, the foregoing will so fully explain the gist of my invention that others may by applying current knowledge, readily adapt the same for use under varying conditions of service, without eliminating certain features, which may properly be said to constitute the essential items of novelty involved, which items are intended to be defined and secured to me by the following claims.

I claim:

1. A tendon extractor for poultry comprising a base, a leg-engaging portion extending from said base and having a plurality of upright members defining leg-receiving slot portions therebetween, a rotatable furcate member pivotally mounted on said base having its periphery spaced from said leg-engaging portion of said base a distance less than the width of said slot portions, and a handle secured to said rotatable member to rotate said member relative to said base whereby initial rotation of said handle will shear the shanks of such poultry placed in said furcate member and continued rotation will extract the tendons from the legs of such poultry, said rotatable member and the leg-engaging portion of said base being in spaced relation whereby such shanks are severed by a shear force and the associated tendons are left intact to pass between said leg-engaging portion and said rotatable member.

2. A tendon extractor for poultry comprising a fixed elongated furcate member to engage a substantial length of the shanks of such poultry, and a rotatable member having an outer surface curved to maintain a substantially fixed spaced relationship to said fixed furcate member during rotation, said surface being slotted to correspond to said furcate member to receive the lower shanks and feet of such poultry whereby rotation of said rotatable member will cause a shear force to be applied to said shanks normal thereto.

3. A tendon extractor for poultry comprising a fixed elongated furcate member to engage a substantial length of the shanks of such poultry, and a rotatable member having a curved outer surface, said rotatable member being mounted whereby said curved outer surface bears a predetermined spaced relation to said fixed furcate member during relative rotation thereof, said curved outer surface being slotted corresponding to said furcate member whereby the lower shanks and feet of such poultry are engageable thereby so that rotation of said rotatable member will sever such shanks and cause the tendons therein to be disposed along said curved outer surface whereby continued rotation of said rotatable member will produce a tangential force on said tendons normal to the substantial portion of said shanks.

4. A tendon extractor for poultry comprising a plurality of upright members forming spaces therebetween having substantially parallel sides and arranged in spaced relation to receive a substantial portion of the shanks of such poultry, a rotatable member pivotally mounted about an axis removed from said upright members and having a curved surface spaced a predetermined distance therefrom, said curved surface being slotted to correspond to the spaces between said upright members whereby the lower shanks and feet of such poultry will be engaged by said slots, the distance between said relatively rotatable members being less than the space between said uprights, and a handle secured to said rotatable member whereby motion of said handle will shear such poultry shanks and further motion of said handle will withdraw the tendons from the poultry.

5. A tendon extractor for poultry comprising a base, a slotted elongated shank-engaging portion extending from said base and having an arcuate surface, a cylindrical member rotatably mounted on said base whereby the periphery of said cylinder is in spaced relation to the arcuate surface of said shank-engaging portion of said base, said cylinder member having a slotted portion corresponding to and alignable with the slotted portion of said base, and a handle secured to said cylindrical member to rotate said cylindrical member relative to said base whereby initial rotation of said handle will sever the shanks of such poultry placed in said slotted portions, and continued rotation will extract the tendons from the leg of such poultry.

6. A tendon extractor for poultry comprising a base, a slotted elongated shank-engaging portion extending from said base and having an arcuate surface, a cylindrical member rotatably mounted on said base whereby the periphery of said cylinder is in spaced relation to the arcuate surface of said shank-engaging portion of said base, said spaced relation being sufficient only to pass such tendons between said cylindrical member and the concave surface of said shank-engaging portion of the base, said cylinder member having a slotted portion corresponding to the slotted portion of said base, and a handle secured to said cylindrical member to rotate said member relative to said base whereby initial rotation of said handle will shear the shanks of such poultry placed in said slotted portions, and continued rotation thereof will extract the tendons from the leg of such poultry.

7. A tendon extractor for poultry comprising a base, a slotted elongated shank-engaging portion extending from said base and having an arcuate surface, a cylindrical member having one end thereof closed and rotatably mounted on said base at the center of said closed end whereby the periphery of said cylinder is in spaced relation to the arcuate surface of said shank-engaging portion of said base, said cylindrical member having a slotted portion corresponding to the slotted portion of said base to receive the lower shanks and feet of such poultry, and a handle secured to said cylindrical member to rotate said cylindrical member relative to said base whereby initial rotation of said handle will shear the shanks of such poultry and continued rotation will extract the tendons from the leg of such poultry causing such tendons to lie along the periphery of said cylinder, said cylinder being spaced from the arcuate surface of said shank-engaging portion only a distance sufficient to allow passage of such tendons therebetween.

8. A tendon extractor for poultry comprising a base having means to secure said base to a fixed support, a slotted shank-engaging portion extending from said base and having an arcuate surface, a cylindrical member having one end thereof closed and rotatably mounted on said base at the center of said closed end whereby the periphery of said cylinder is in spaced relation to the concave surface of said shank-engaging portion of said base, said cylindrical member having a slotted portion corresponding to the slotted portion of said base to receive the lower shanks and feet of such poultry, and a handle secured to said cylindrical member to rotate said cylindrical member relative to said base whereby initial rotation of said handle will sever the shanks of such poultry and continued rotation will extract the tendons from the legs of such poultry causing such tendons to lie along the periphery of said cylinder, said cylinder being spaced from the arcuate surface of said shank-engaging portion a distance sufficient only to allow passage of such tendons therebetween.

9. A tendon extractor for poultry comprising a furcate shank-engaging member having a plurality of elongated upright members forming space portions therebetween to receive a substantial length of the shanks of such poultry, a rotatable member pivotally mounted about an axis removed from said upright members and having a curved surface spaced a predetermined distance therefrom, said curved surface being slotted to correspond to the spaces between said upright members whereby the lower shanks and feet of such poultry will be engaged by said slots, the distance between said relatively rotatable members being less than the space between said uprights, the diagonally opposed edges of said uprights and said rotatable member being serrated.

References Cited in the file of this patent

UNITED STATES PATENTS

| Number | Name | Date |
|---|---|---|
| 531,641 | Payne | Jan. 1, 1895 |
| 620,529 | Andre | Feb. 28, 1899 |
| 732,300 | Hollender | June 30, 1903 |
| 1,912,124 | Braumuller | May 30, 1933 |

FOREIGN PATENTS

| Number | Country | Date |
|---|---|---|
| 380,574 | France | Oct. 11, 1907 |
| 326,037 | Great Britain | Mar. 6, 1930 |